(12) United States Patent
Heselhaus (10) Patent No.: US 8,056,956 B2
(45) Date of Patent: Nov. 15, 2011

(54) CONVERTIBLE ROOF WITH SUN ROOF PART

(75) Inventor: Udo Heselhaus, Ibbenburen (DE)

(73) Assignee: Wilhelm Karmann GmbH, Munich (DE)

( * ) Notice: Subject to any disclaimer, the term of this patent is extended or adjusted under 35 U.S.C. 154(b) by 0 days.

(21) Appl. No.: 11/996,189

(22) PCT Filed: Jul. 12, 2006

(86) PCT No.: PCT/DE2006/001202
§ 371 (c)(1),
(2), (4) Date: Feb. 21, 2008

(87) PCT Pub. No.: WO2007/009432
PCT Pub. Date: Jan. 25, 2007

(65) Prior Publication Data
US 2008/0272626 A1    Nov. 6, 2008

(30) Foreign Application Priority Data

Jul. 21, 2005 (DE) .................. 10 2005 034 736
Sep. 9, 2005 (DE) .................. 10 2005 042 982

(51) Int. Cl.
*B60J 7/047* (2006.01)
(52) U.S. Cl. .......... 296/107.15; 296/216.02; 296/216.03
(58) Field of Classification Search ............ 296/216.02–216.03, 221, 107, 107.01–107.2, 213, 216.06, 296/216.07, 216.08, 136.05, 136.1; *B60J 7/047*
See application file for complete search history.

(56) References Cited

U.S. PATENT DOCUMENTS

| | | | |
|---|---|---|---|
| 4,063,774 A | 12/1977 | Hanks | |
| 5,769,483 A * | 6/1998 | Danzl et al. | 296/107.08 |
| 6,378,935 B2 * | 4/2002 | Dryselius et al. | 296/213 |
| 6,439,642 B2 * | 8/2002 | Mac Farland | 296/108 |
| 6,474,731 B2 | 11/2002 | De Gaillard et al. | |
| 6,485,091 B2 | 11/2002 | Karami et al. | |
| 6,827,392 B2 * | 12/2004 | Doncov et al. | 296/147 |
| 6,890,022 B2 * | 5/2005 | Doncov et al. | 296/213 |
| 6,945,590 B2 * | 9/2005 | Doncov et al. | 296/147 |
| 6,979,042 B2 * | 12/2005 | Kawasaki | 296/97.8 |
| 7,029,052 B2 * | 4/2006 | Troeger et al. | 296/107.19 |
| 7,118,161 B2 * | 10/2006 | Neubrand | 296/107.15 |
| 2004/0104604 A1 * | 6/2004 | Doncov et al. | 296/216.04 |
| 2004/0104605 A1 * | 6/2004 | Doncov et al. | 296/216.04 |
| 2004/0145219 A1 * | 7/2004 | Doncov et al. | 296/220.01 |
| 2005/0206197 A1 * | 9/2005 | Troeger et al. | 296/187.09 |
| 2008/0258491 A1 * | 10/2008 | Just et al. | 296/108 |

FOREIGN PATENT DOCUMENTS

DE    9108242 U1 * 11/1992

\* cited by examiner

*Primary Examiner* — Glenn Dayoan
*Assistant Examiner* — Pinel Romain
(74) *Attorney, Agent, or Firm* — Gifford, Krass, Sprinkle, Anderson & Citkowski, P.C.

(57) ABSTRACT

A convertible roof includes an outer cover with a recess defined therein. The roof has a front roof edge which joins the windshield frame when the convertible roof is in a closed position. The front region of the roof includes a rigid assembly disposed under the cover. The rigid assembly includes a frame part. A sun roof part is received in the recess defined by the cover and is openable to a position raised out of a plane defined by the roof cover. The recess defined by the cover is open to the front.

16 Claims, 10 Drawing Sheets

CONVERTIBLE ROOF WITH SUN ROOF PART

REFERENCE TO RELATED APPLICATIONS

This application is the United States national phase application of PCT/DE2006/001202, filed Jul. 12, 2006, which claims priority from German patent application No. DE102005034736.3, filed Jul. 21, 2005 and DE102005042982.3, filed Sep. 9, 2005, the entire content of each application is incorporated herein by reference.

FIELD OF THE INVENTION

The invention relates to a convertible vehicle having a movable roof provided with a cover and having a sun roof part.

BACKGROUND OF THE INVENTION

It is known to provide a sun roof part in a convertible soft top which can be raised when the top is closed. The total size of such a sun roof part must, however, be disposed within a roof region which does not fold when the top opens and the soft cover folds. The area available for the sun roof part is therefore small.

SUMMARY OF THE INVENTION

The present invention provides a convertible with a sun roof part that may extend close to the front edge so that its area is increased.

The front edge of the sun roof part may form a part of the front edge of the convertible roof and thus extend its area completely to the front.

The front edge region of the sunroof part may be supported from beneath by a front crossmember of the frame part which is lower than the side and rear members of the frame part. The frame part is preferably one piece for simple manufacturing and for optimized roof stability. Since the crossmember is lowered, a large amount of light is admitted. In addition, the sunroof looks continuous from the outside since the crossmember may be completely covered by the sun roof part.

The sun roof surface may be maximized when it directly adjoins the windshield when the roof is closed. It is not bounded by any upper transverse frame part visible from the outside. The windshield then visually merges uniformly into the sun roof part.

Portions of the roof to the sides of the recess may include a cover that extends up to the front edge of the roof and integrates visually with the rest of the covered roof. The side and rear members of the frame part ma be configured as water channels for sealing.

The sunroof part may have a light-sensitive glass tint. Alternatively, a blind or a similar shading unit can be associated with the sun roof part. The blind may also be closable automatically when the roof is opened in order to prevent a view of the roof parts disposed under the opened roof when the front portion of the roof remains facing upwardly in the original orientation.

The sun roof part may be formed of polycarbonate for good break resistance at low weight.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE INVENTION

Figure 1:
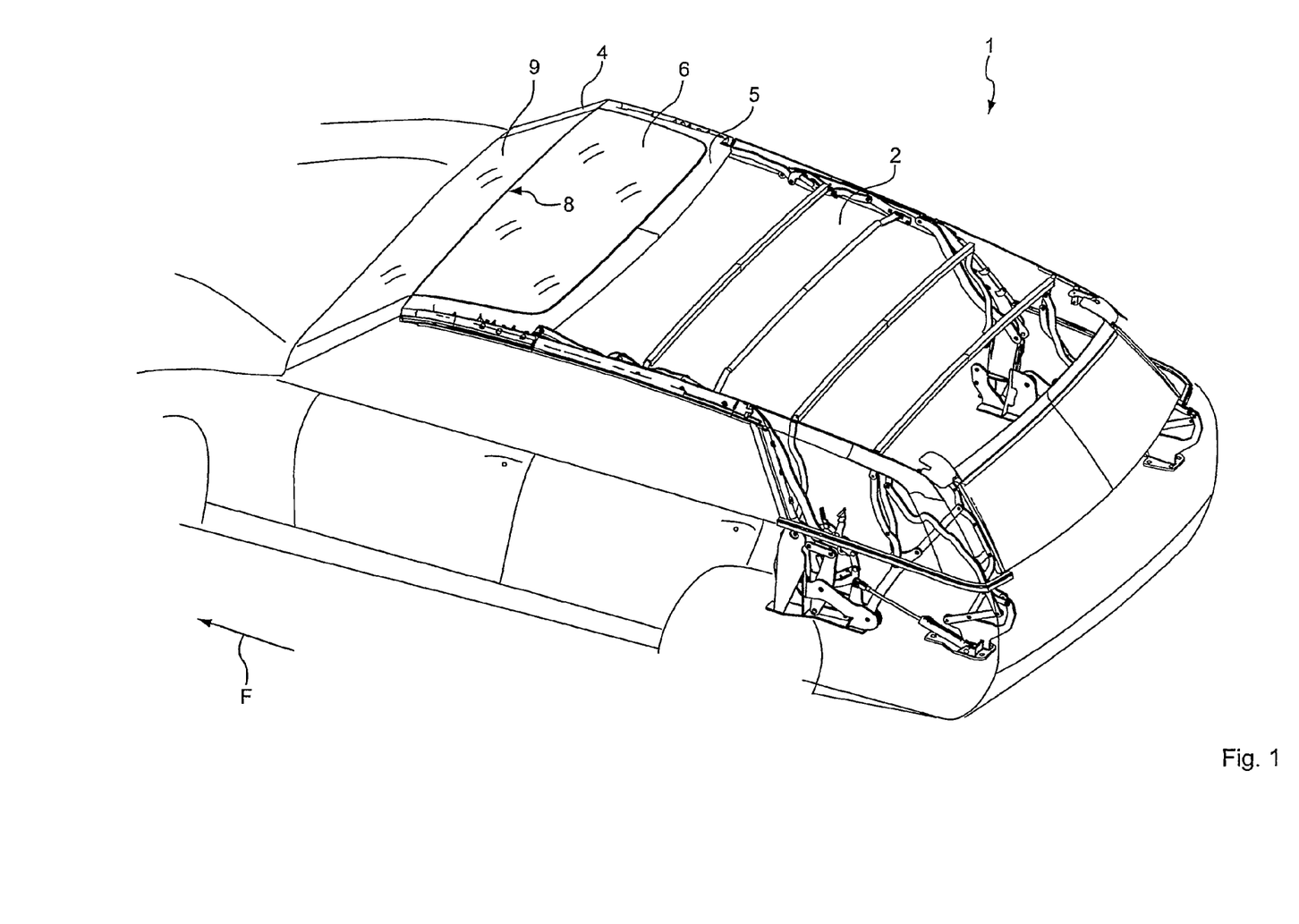
FIG. 1 is a rear perspective view of a convertible vehicle according to an embodiment of the present invention with the roof closed and the cover removed.

A convertible vehicle 1 is shown schematically in FIG. 1. The vehicle includes a movable roof 2 which can be stowed in the rearward body region when the roof is open. The roof 2 can be configured differently than shown and may include generally rigid roof parts. In each embodiment, when the roof is closed a front region faces a windshield frame 4 with a windshield 9 disposed therein. The roof includes a cover 3 which is at least partly supported by a rigid assembly 5 disposed under the cover 3. The assembly 5 forms a frame part for a sun roof part 6 and the sunroof part 6 can be raised out of the plane of the roof cover 3.

The roof 2 shown in the drawing has a relatively long design. This design is not compulsory, but is suitable, for example, to cover the passenger compartment of a station wagon, a van or a SVU having two or more rows of seats behind one another and to cover back to a trunk or a hatchback of the vehicle.

To permit the sunroof part 6 to be embedded into the outer surface of the roof cover 3, a U-shaped recess is provided in the roof cover 3. The U-shaped recess is open to the front, with respect to the direction of vehicle travel F. In the illustrated embodiment, the cover 3 has two lateral, narrow longitudinal side regions 7 without a front transverse connection. These longitudinal side regions 7 of the cover 3 extend up to the front roof edge. The longitudinal side regions 7 of the cover 3 are engaged from behind over most of their surface so that these regions are not tensioned in a freely movable manner.

Figure 2:
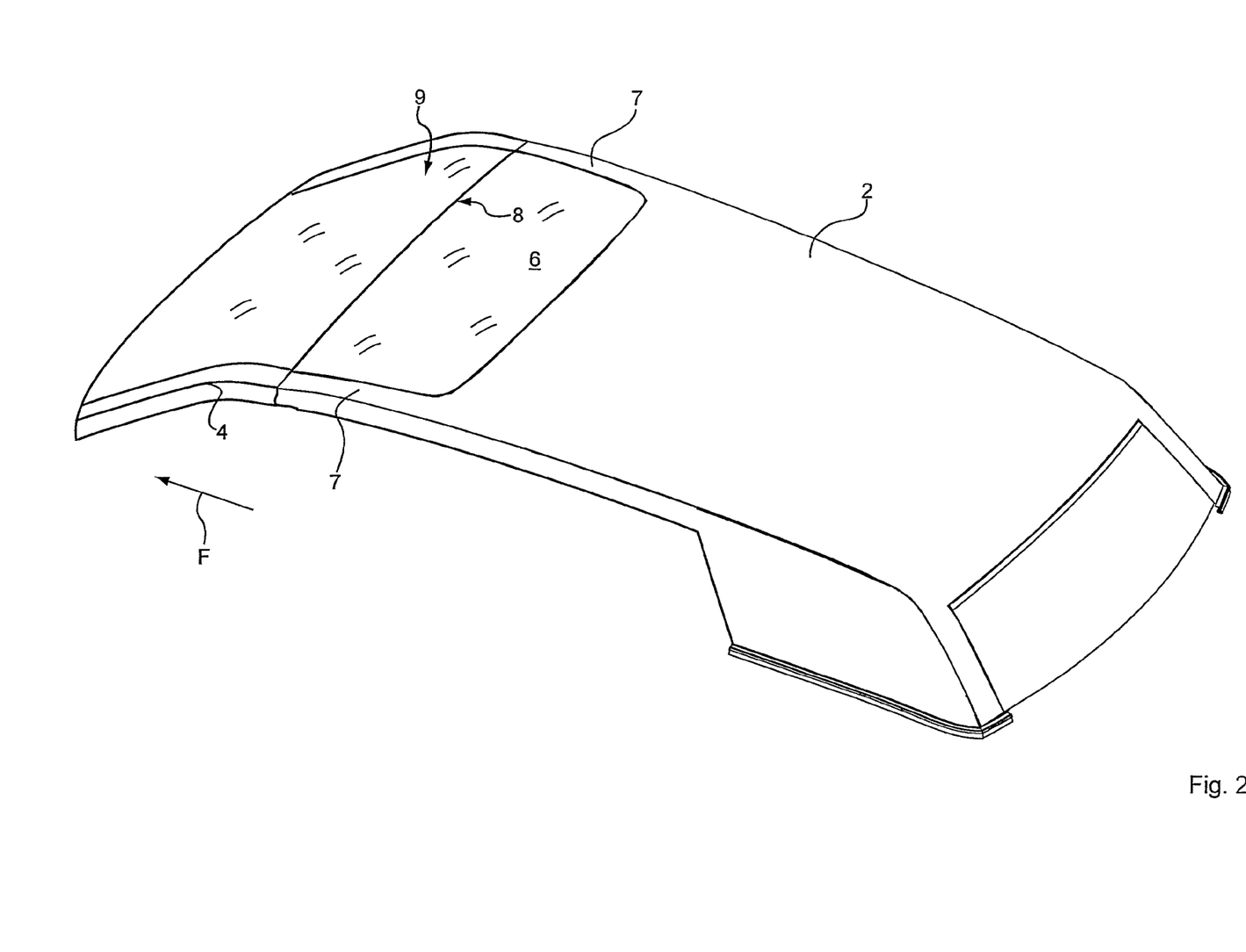
FIG. 2 is a perspective view similar to FIG. 1, with the roof cover shown.
Figure 3:
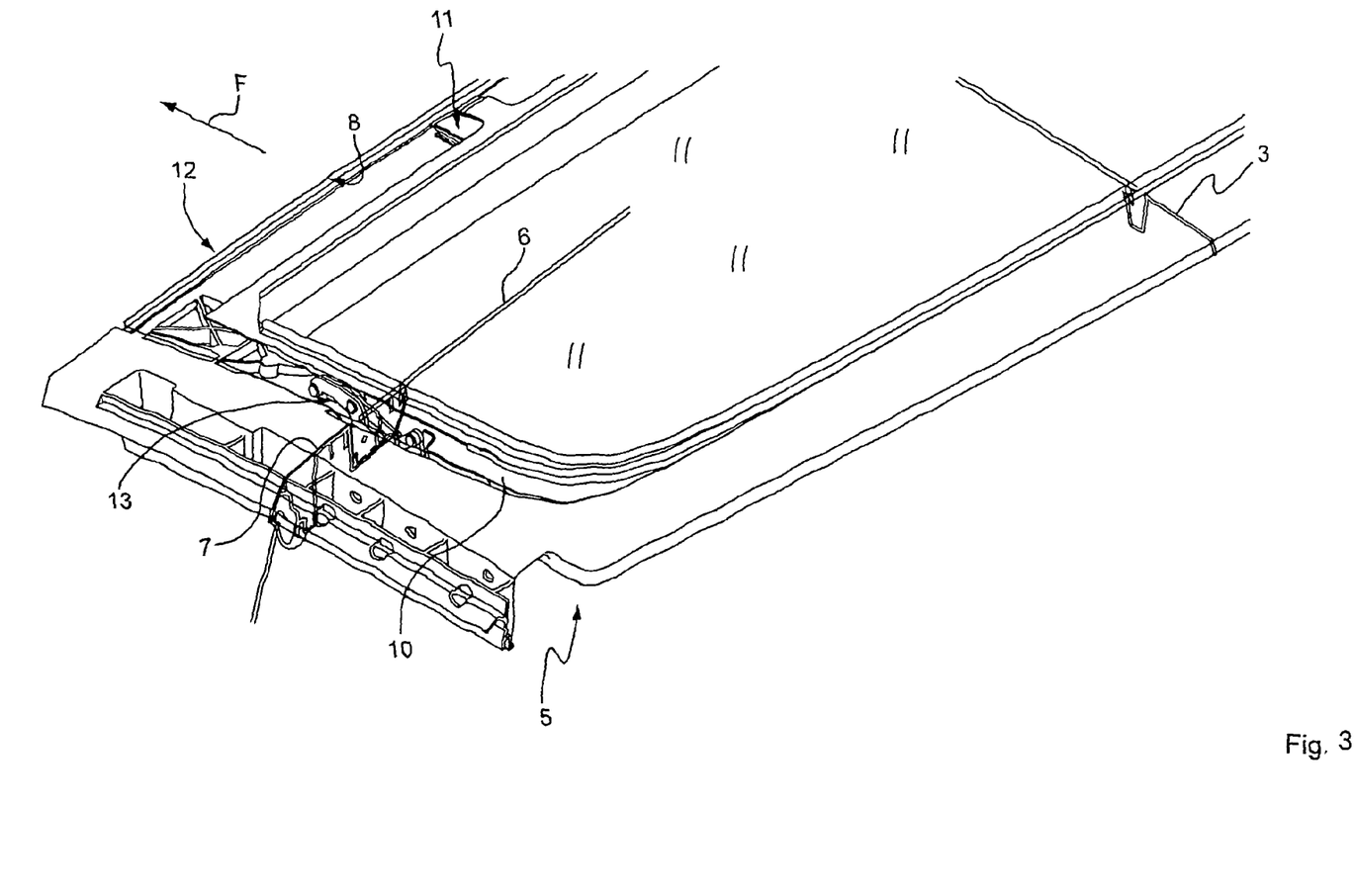
FIG. 3 is a detailed view of a portion of the roof including a sun roof part, illustrating the left side of the sun roof part, with respect to the direction of vehicle travel F.

The front edge 8 of the sun roof part 6 itself forms the outer front roof edge in the center transverse region. The sun roof part 6 therefore directly adjoins the windshield 9 when the roof is closed. As shown in FIG. 2, this provides a uniform appearance of the sun roof part 6 and windshield 9 so that they look continuous. Preferably, the width of the windshield 9 and the sun roof part 6 is the same so that there is no step at the sides. The covered longitudinal side regions 7 are therefore correspondingly narrow. Nor does the windshield frame 4 have to have any transverse frame part—or none which is visible from the outside—at its upper edge. The windshield 9 then appears visually continuous with the movable sun roof part 6.

The assembly 5 supporting the sun roof part 6 can be manufactured simply, in one piece and, for example, as a cast light metal part. The assembly 5 includes a frame part 10 disposed under the sun roof part that extends to the sides and rear of the sun roof part. The frame part has a generally U-shaped cross section so as to provide a water channel. The frame part 10 may include a front crossmember 12, which is lower than the side and rear members of the frame part 10. The front cross member 12 forms a closed contour to increase the stability of the frame part. The front cross member also provides a support surface for front pivot holders 11 for the sun roof part 6. This front crossmember 12 can be covered by the sun roof part 6 since it is lower than the other portions of the frame part. Therefore, the front cross member is not visible from the outside if the sun roof part 6 is tinted.

Front pivot holders 11 for the sun roof part may not be needed if the lateral lifting mechanisms are sufficiently stable, in particular in the front region, or additional holders are provided in the lateral region.

Figure 4:
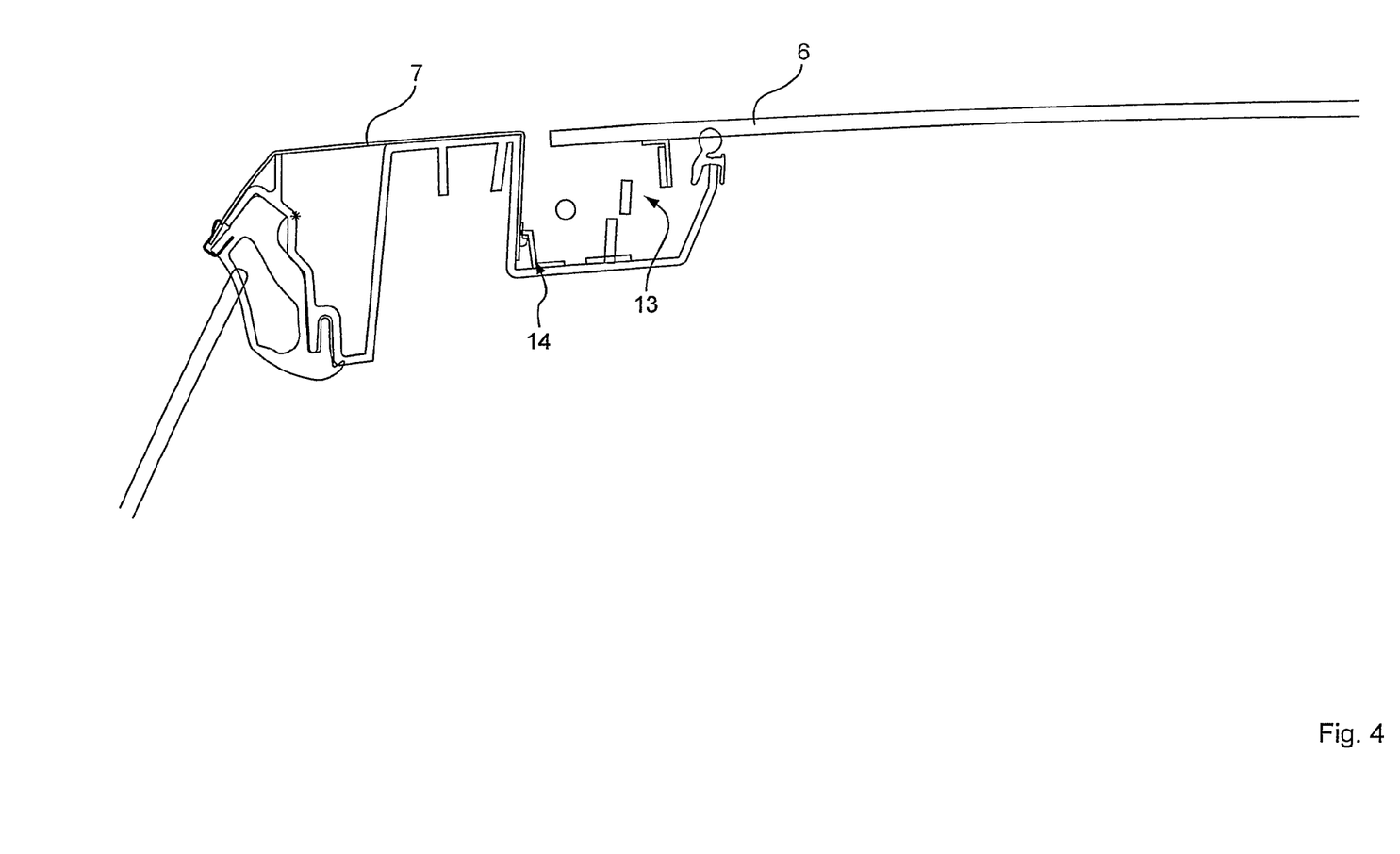
FIG. 4 is a transverse cross sectional view of the portion of the top shown in FIG. 3.
Figure 5:
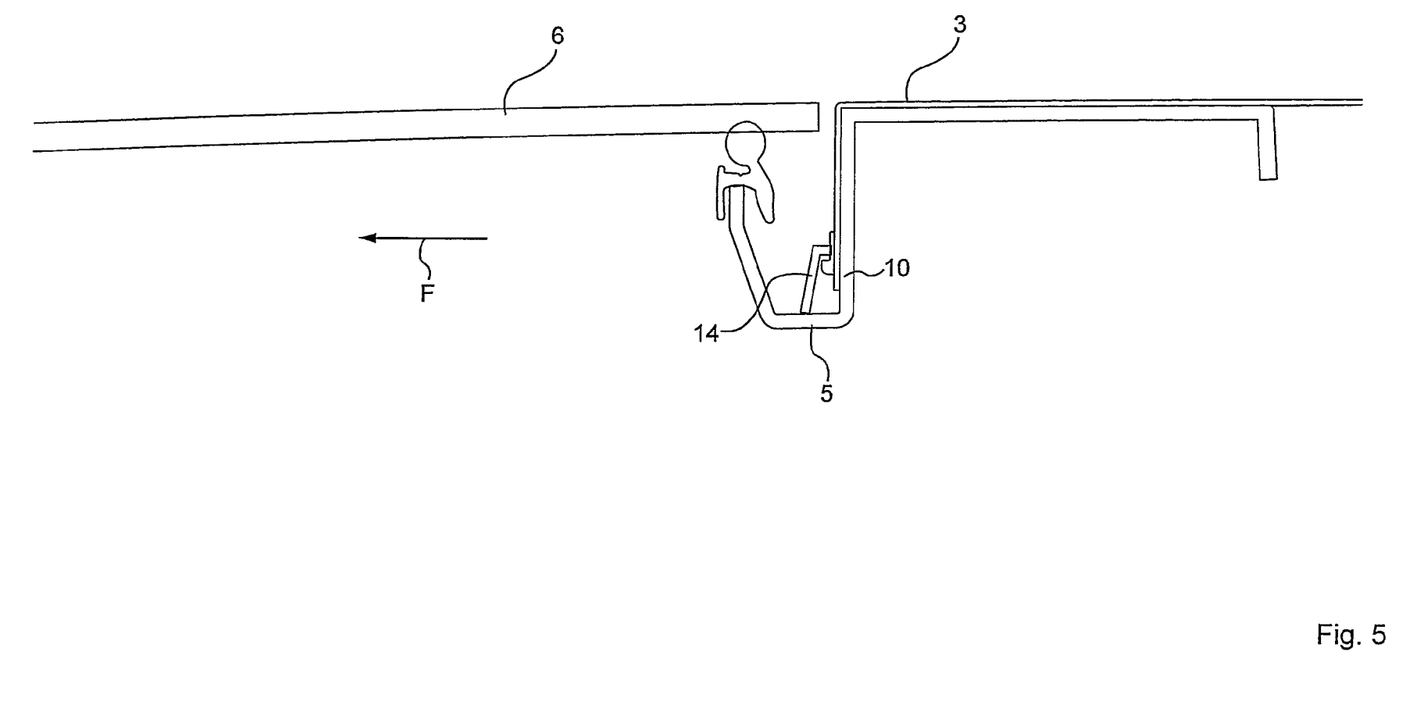
FIG. 5 is a longitudinal cross sectional view of the portion of the top shown in FIG. 3.
Figure 6:
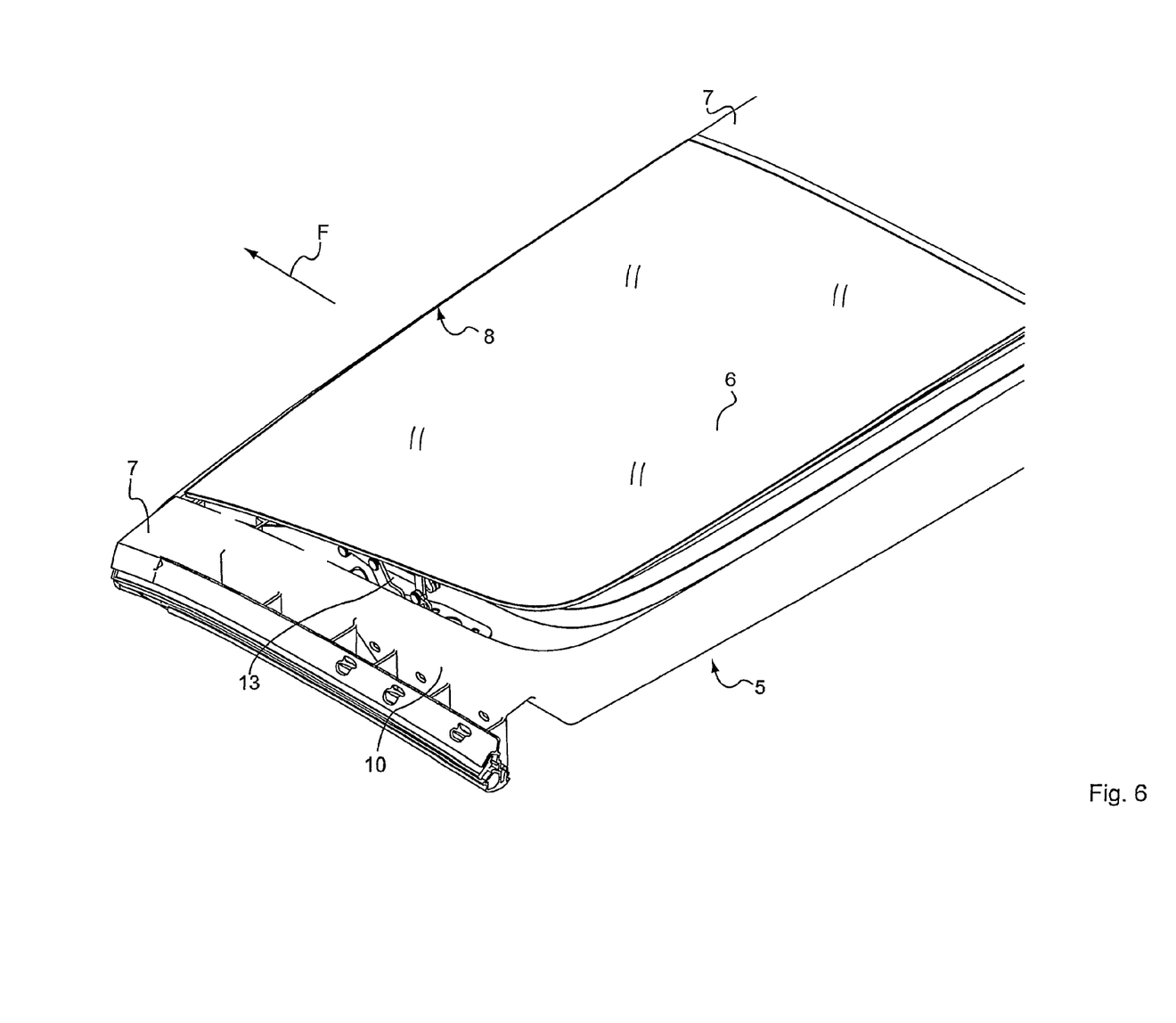
FIG. 6 is a view similar to FIG. 3 with the surrounding cover shown and the sun roof part in a partially raised position.
Figure 7:
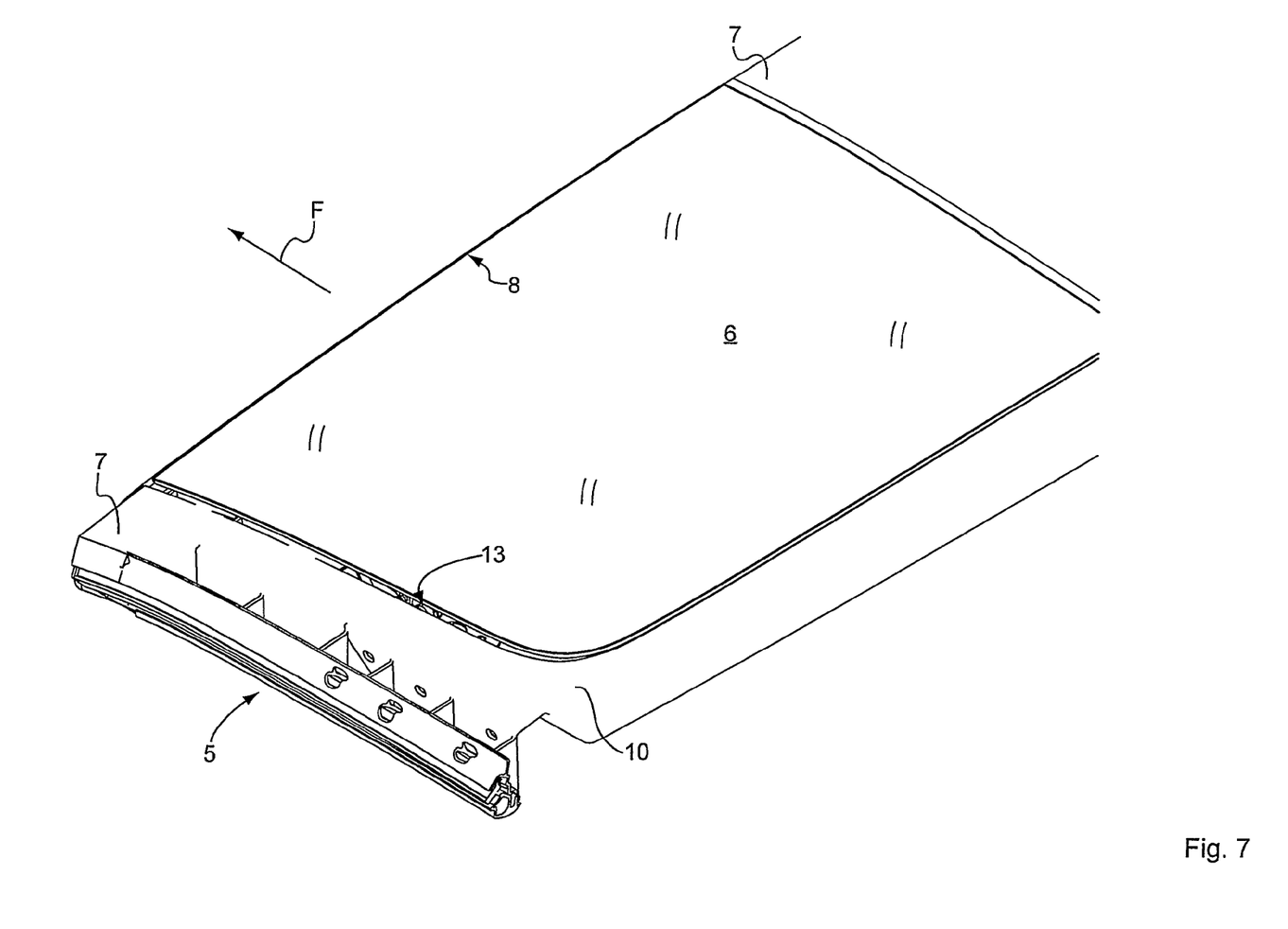
FIG. 7 is a view similar to FIG. 6 with the sun roof part in the closed position.
Figure 8:
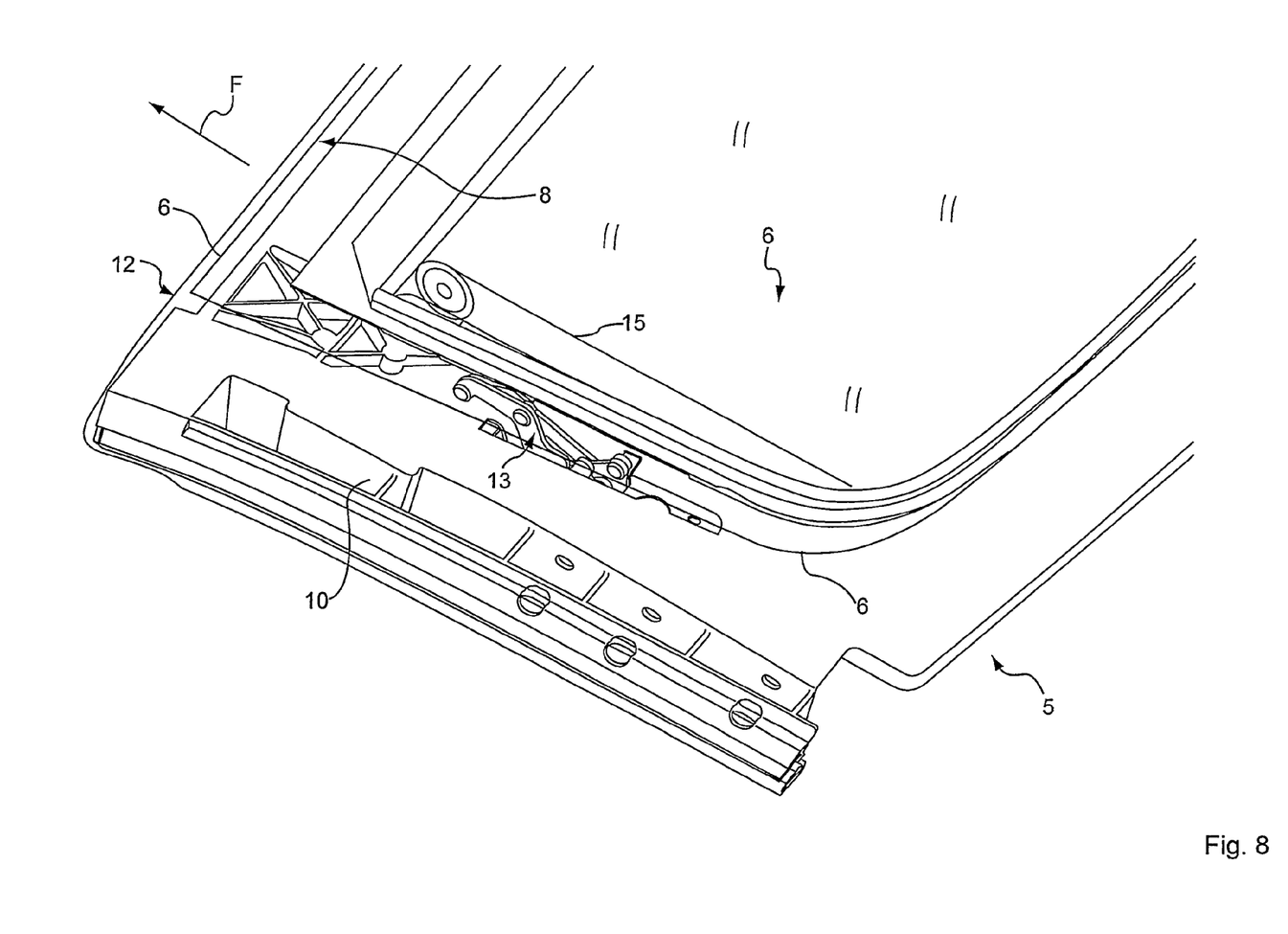
FIG. 8 is a view similar to FIG. 3 showing a blind drawn closed under the sun roof part.
Figure 9:
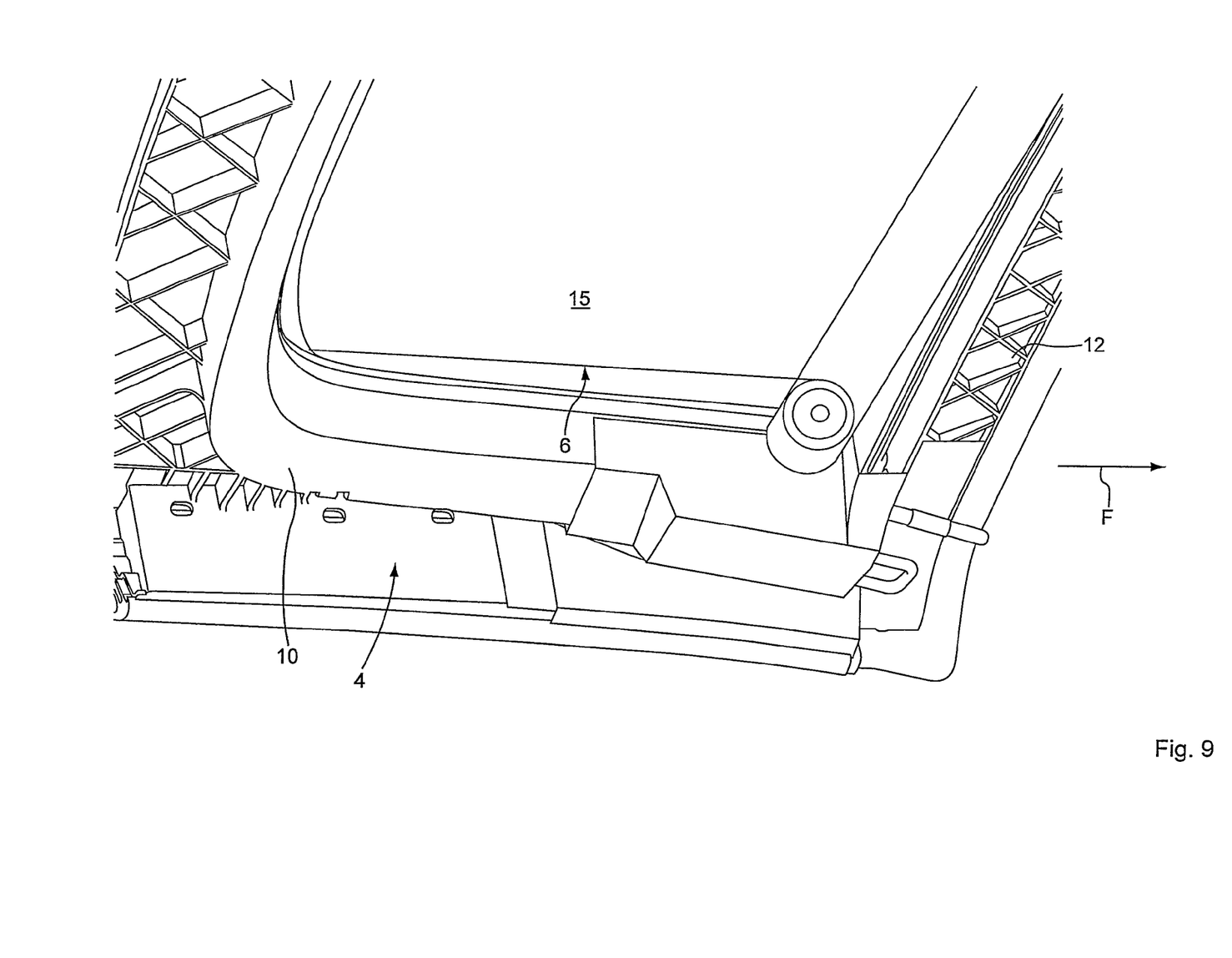
FIG. 9 is a perspective view from the underside of the top showing the left side of the sun roof part with the blind closed.

Respective lifting mechanisms for the sun roof part 6 are arranged in the lateral sections of the frame part 10 so that the rear edge of said sun roof part can be moved upwardly, as shown in FIG. 6. The cover 3 also extends deep into the channels of the frame part 10. As can be seen in section through the longitudinal side region 7 of the cover 3 (FIG. 4), the cover is held in place by a clamping rail 14 disposed at the bottom of the water channel. The relationships are similar in the rear section of the frame part 10. FIG. 5 provides a cross section at the transverse center of the vehicle.

Though not shown, the lifting mechanism may include displacement devices to move the sun roof part rearwardly. The sun roof part 6 would then also become a sliding roof. The displacement devices may include sections which are mutually displaceable telescopically and can therefore be accommodated in a short and space-saving manner in the lateral water channels of the frame part 10 when they are retracted.

The crossmember 12 described above can also serve in a dual function to receive a blind 15 or a similar shading unit. In embodiments not including the cross member 12, another crossmember can be provided to receive a blind or shade. In the illustrated embodiment, the blind 15 is disposed somewhat behind the crossmember 12 and can be pulled out to the rear, which is opposite to the direction of travel F. The movement of the blind can take place manually or via an electric drive, for example.

Figure 10:
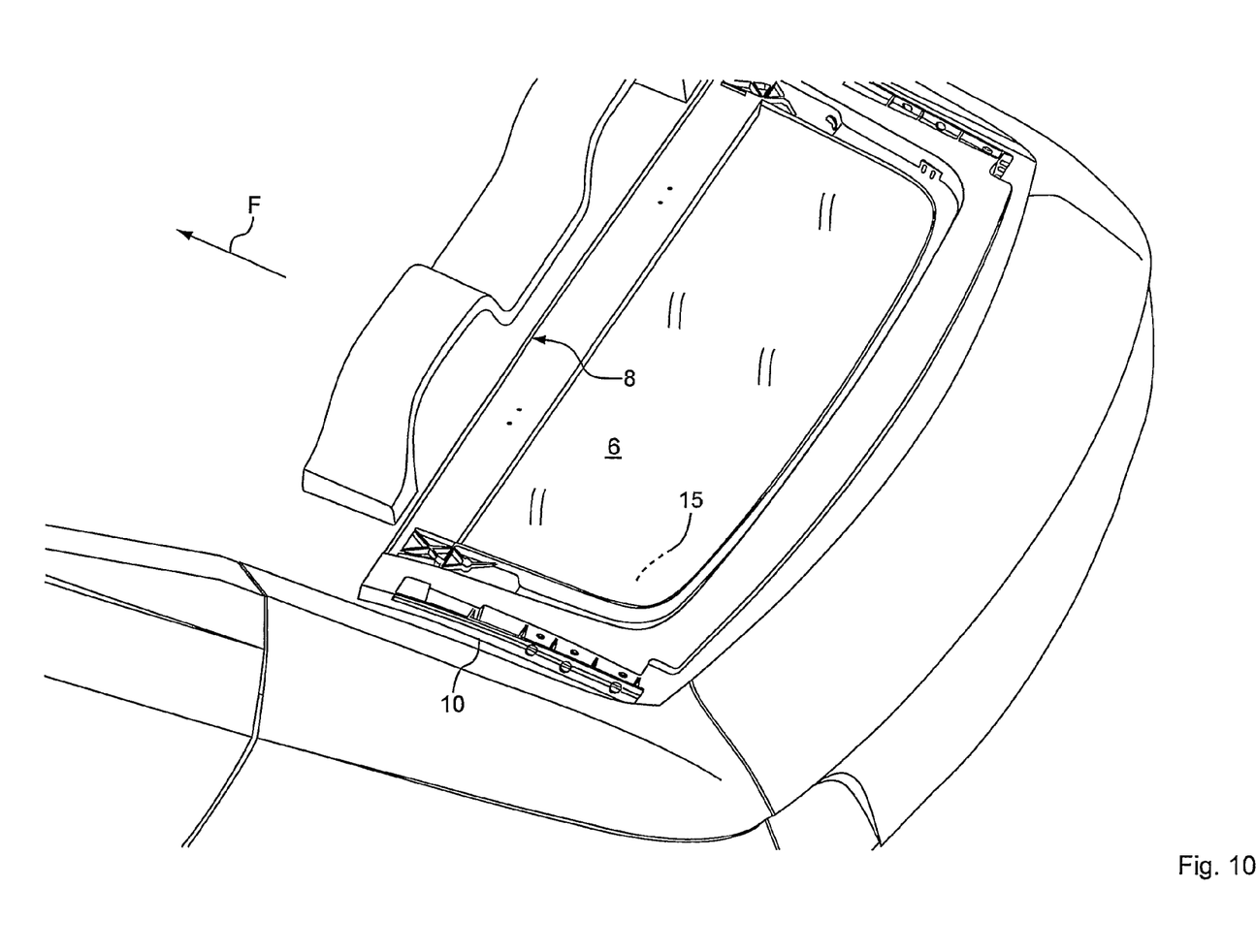
FIG. 10 is a perspective top view of the rear vehicle region with the roof open.

The blind 15 is preferably automatically moved when the roof is opened such that it is disposed under the sun roof part 6. Therefore, a view through the sunroof to parts of the roof located below it and/or to the roof mechanisms is blocked, as shown in FIG. 10.

The sun roof part 6 itself can be one piece or have a multipart design, and may be formed partially or entirely of a light and break-resistant material, for instance polycarbonate.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A convertible vehicle comprising:
a vehicle body having a passenger compartment and a windshield frame supporting a windshield;
a convertible roof having an closed position wherein the convertible roof extends over the passenger compartment and an open position, the convertible roof having a flexible outer cover with a recess defined in a forward-most portion thereof, the recess being open to the front, the flexible outer cover having an edge at the sides and rear of the recess, the convertible roof further having a front region with a front roof edge which joins the windshield frame when the convertible roof is in the closed position;
the front region including a rigid assembly disposed under the flexible outer cover, the rigid assembly including a frame part; and
a sun roof part received in the recess defined by the cover, the sun roof part being openable to a position raised out of a plane defined by the roof cover;
the frame part of the rigid assembly being U-shaped with side members extending to the sides of the sun roof part and a rear member extending across the rear of the sun roof part; and
the U-shaped frame part retaining the edge of the flexible outer cover at the sides and rear of the recess such that the frame part retains a forward portion of the flexible outer cover around the recess.

2. A convertible vehicle according to claim 1, wherein the sun roof part has a front edge forming part of the front roof edge of the convertible roof.

3. A convertible vehicle according to claim 1, wherein the side members and the rear member of the frame part of the rigid assembly each including a water channel.

4. A convertible vehicle according to claim 3, wherein the frame part of the rigid assembly further includes a front crossmember, the front crossmember being lowered with respect to the side and rear members of the frame part.

5. A convertible vehicle according to claim 4, wherein the rigid assembly is one piece.

6. A convertible vehicle according to claim 3, further comprising lifting mechanisms for opening the sun roof part are disposed in the side members of the frame part.

7. A convertible vehicle according to claim 2, wherein the front edge of the sun roof part directly adjoins the windshield when the convertible roof is closed.

8. A convertible vehicle according to claim 1, wherein the outer cover of the convertible roof has lateral side regions that extend to the front roof edge of the convertible roof.

9. A convertible vehicle according to claim 1, further comprising a crossmember having a shading unit for covering the sun roof part.

10. A convertible vehicle according to claim 9, wherein the shading unit moves automatically to a covering position when the roof is moved to the open position.

11. A convertible vehicle according to claim 1, wherein the sun roof part is formed at least partially from polycarbonate.

12. A convertible vehicle comprising:
a vehicle body having a passenger compartment and a windshield frame supporting a windshield;
a convertible roof having an closed position wherein the convertible roof extends over the passenger compartment and an open position, the convertible roof having a flexible outer cover with a recess defined in a forward-most portion thereof, the recess defined by the cover being open to the front, the flexible outer cover having an edge at the sides and rear of the recess, the convertible roof further having a front region with a front roof edge which joins the windshield frame when the convertible roof is in the closed position;

the front region including a rigid assembly disposed under the flexible outer cover, the rigid assembly including a frame part;

a sun roof part received in the recess defined by the cover, the sun roof part being openable to a position raised out of a plane defined by the roof cover, the sun roof part having a front edge forming part of the front roof edge of the convertible roof such that the sun roof part is juxtaposed with the windshield;

the frame part of the rigid assembly being U-shaped with side members extending to the sides of the sun roof part and a rear member extending across the rear of the sun roof part, the frame part of the rigid assembly further including a front crossmember, the front crossmember being disposed below the sun roof part; and the U-shaped frame part retaining the edge of the flexible outer cover at the sides and rear of the recess such that the frame part retains a forward portion of the flexible outer cover around the recess.

13. A convertible vehicle according to claim 12, wherein the side members and the rear member of the rigid assembly each including a water channel.

14. A convertible vehicle according to claim 13, wherein the front crossmember is lowered with respect to the side and rear members of the frame part.

15. A convertible vehicle according to claim 12, wherein the front crossmember is disposed below the front edge of the sun roof part such that the front crossmember abuts the windshield frame when the convertible roof is in the closed position.

16. A convertible vehicle according to claim 1, wherein the frame part of the rigid assembly includes side members extending to the sides of the sun roof part and a rear member extending across the rear of the sun roof part, the flexible outer cover being interconnected with the side members and rear member of the frame part.

* * * * *